United States Patent
Devaraj et al.

(10) Patent No.: US 12,539,769 B2
(45) Date of Patent: Feb. 3, 2026

(54) MECHANICALLY COUPLED ELECTRIC DRIVE UNIT

(71) Applicant: Dana Automotive Systems Group, LLC, Maumee, OH (US)

(72) Inventors: Gowrisankar Devaraj, Leamington Spa (GB); Cody Ott, Ida, MI (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 125 days.

(21) Appl. No.: 18/391,317

(22) Filed: Dec. 20, 2023

(65) Prior Publication Data

US 2025/0206146 A1 Jun. 26, 2025

(51) Int. Cl.
*B60K 6/26* (2007.10)
*B60K 1/02* (2006.01)
*B60K 17/04* (2006.01)
*B60L 7/18* (2006.01)
*B60L 15/20* (2006.01)
*B60K 7/00* (2006.01)

(52) U.S. Cl.
CPC .............. *B60L 15/20* (2013.01); *B60K 1/02* (2013.01); *B60K 17/046* (2013.01); *B60L 7/18* (2013.01); *B60K 2006/266* (2013.01); *B60K 2007/0061* (2013.01)

(58) Field of Classification Search
CPC .. B60L 15/20; B60L 7/18; B60K 1/02; B60K 17/046; B60K 2006/266; B60K 2007/0061
See application file for complete search history.

(56) References Cited

U.S. PATENT DOCUMENTS

| | | | |
|---|---|---|---|
| 5,934,395 A | 8/1999 | Koide et al. | |
| 9,193,255 B2 | 11/2015 | Arnold et al. | |
| 10,457,135 B2 | 10/2019 | Tang et al. | |
| 2023/0100807 A1* | 3/2023 | Chai | B60K 17/165 |
| | | | 180/65.6 |

FOREIGN PATENT DOCUMENTS

| | | | | |
|---|---|---|---|---|
| CN | 109466340 A | | 3/2019 | |
| CN | 106915232 B | * | 2/2020 | ............. B60K 17/08 |
| WO | WO-9710114 A1 | * | 3/1997 | ...... B60W 30/18027 |
| WO | 2019109899 A1 | | 6/2019 | |

* cited by examiner

Primary Examiner — Justin Holmes
(74) Attorney, Agent, or Firm — McCoy Russell LLP

(57) ABSTRACT

Systems and methods are provided for an electric drive unit. The electric drive unit includes a first electric machine and a second electric machine, a first transmission coupled to the first electric machine, a second transmission coupled to the second electric machine and a disconnect. The disconnect is arranged between a shaft coupled to the first transmission and a shaft coupled to the second transmission and configured to mechanically couple the first transmission and the second transmission.

18 Claims, 8 Drawing Sheets

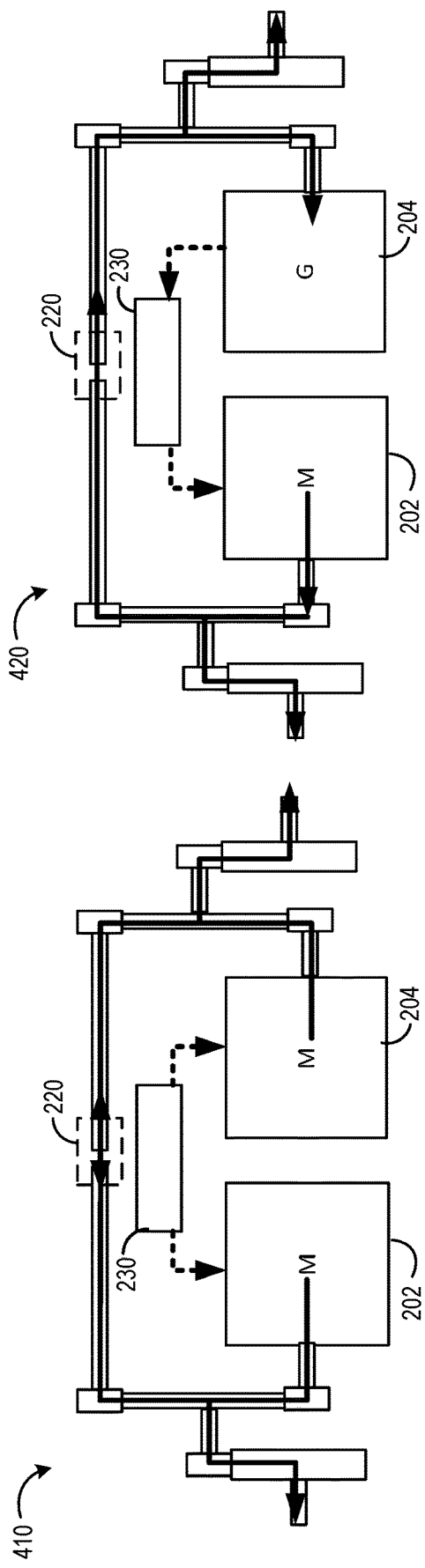
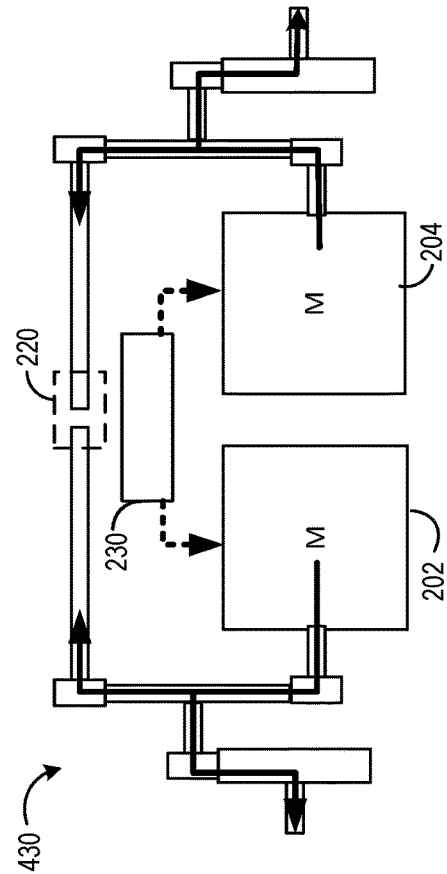
FIG. 4A
FIG. 4B
FIG. 4C

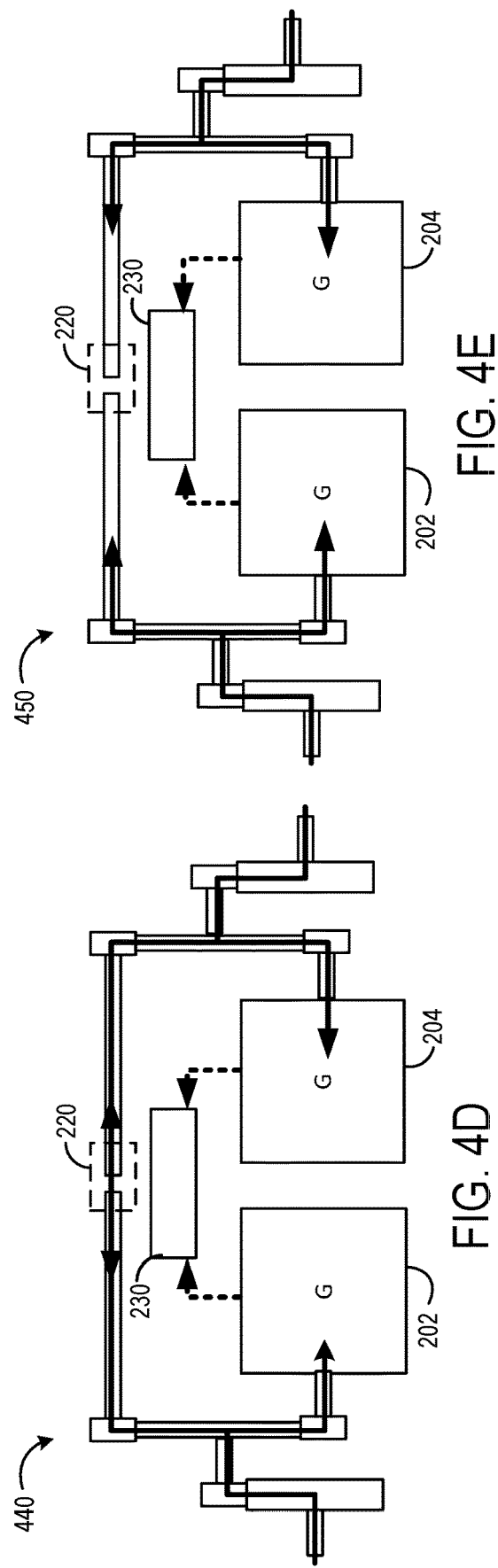

MECHANICALLY COUPLED ELECTRIC DRIVE UNIT

TECHNICAL FIELD

The present description relates generally to an electric drive unit configured for use in an electric or hybrid vehicle.

BACKGROUND AND SUMMARY

Electric and hybrid vehicles often use an electric drive unit (EDU) capable of regenerative braking in which a motor, or several motors, can function as generator(s) that can transfer energy to a battery in the process of braking and coasting in order to conserve energy that would otherwise be lost as heat. This regeneration of energy may power auxiliary functions of the vehicle, such as heating/cooling and sound systems, as well as to extend a range of the traction battery by increasing the amount of energy available in a traction battery to be used by the motor(s) of the vehicle while accelerating.

The inventors have recognized drawbacks of the regenerative braking system of existing EDUs, especially twin systems wherein two electric machines function as motors and/or generators. One problem is that energy is lost as a result of each switch between generator and motor for each electric machine of an EDU. Because both electric machines are adjusted simultaneously between states of generator and motor each time a pedal is depressed and released in existing twin EDUs, energy is lost during conditions in which the electric machine states are adjusted frequently. Additionally, because existing EDUs do not optimize energy usage and regeneration across a full range of different operating conditions, the amount of energy saved through regenerative breaking may not be enough to extend the range of drive. Another problem with twin EDUs which are not mechanically coupled is that they demand complicated torque vectoring calculations to account for inequivalent frictional force between wheels of the vehicle. Therefore, driver control of the vehicle with a traditional EDU may not be adequate under certain driving conditions where torque vectoring is more extreme, including off road driving and launching from rest on inconsistent terrain.

The inventors herein have developed a mechanically coupled EDU that may allow for higher energy efficiency and increased driver control than traditional EDUs by adapting to a broader range of driving conditions with more EDU modes. One embodiment may be an electric drive unit, comprising; a housing; a first electric machine and a second electric machine, each arranged within the housing; a first transmission coupled to the first electric machine and a second transmission coupled to the second electric machine; and a disconnect arranged between a shaft coupled to the first transmission and a shaft coupled to the second transmission, wherein the disconnect is configured to mechanically couple the first transmission and the second transmission.

In one embodiment, two motors and their respective transmissions may be optionally mechanically coupled through a dog clutch on auxiliary gears and shafts. The mechanical coupling creates the option for several modes which are not achievable with traditional twin EDU architectures. By having more EDU modes with different advantages and disadvantages, an optimal balance of energy efficiency and function may be reached for more driving conditions. In other words, having a greater variety of modes of a mechanically coupled EDU may extend the range of drive of an electric or hybrid vehicle in which the electric gear train system is employed, and provide increased stability when needed.

During certain driving conditions, such as coasting on a highway, the mechanically coupled EDU may conserve more energy compared to traditional twin EDU systems by avoiding inefficiency of adjusting both motors between motor and generator modes each time the acceleration pedal is depressed and released, respectively. Instead, the power of one motor may be enough to accelerate the vehicle when needed as the vehicle is coasting, and the other electric machine may continue to act as a generator and convert energy to be stored in a battery. Thus, the states of the electric machines may be adjusted less often between motor and generator during certain driving conditions such as coasting on a highway. In other driving conditions, the distribution of torque achievable by mechanically coupling the electric machines may allow one wheel to experience more torque than one motor may provide when both electric machines function as motors. For example, both electric machines may function as motors during conditions where friction factors of the ground are different locally at each of the wheels. The use of both electric machines as motors may allow increased performance of the vehicle on uneven ground while avoiding complicated torque vectoring calculations during such driving conditions. During other conditions, a dog clutch may also be disengaged such that the motors control each side of the vehicle independently, so torque vectoring may still be achieved at times, such as when the vehicle is cornering. In summary, the flexibility in having multiple modes of the mechanically coupled EDU disclosed herein may allow for advantages in efficiency and function over other EDUs.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIG. 4A shows power flow of a first driving mode of the mechanically coupled EDU.

FIG. 4B shows power flow of a second driving mode of the mechanically coupled EDU.

FIG. 4C shows power flow a third driving mode of the mechanically coupled EDU.

FIG. 4D shows power flow of a fourth driving mode of the mechanically coupled EDU.

FIG. 4E shows power flow of a fifth driving mode of the mechanically coupled EDU.

DETAILED DESCRIPTION

A mechanically coupled EDU is disclosed herein. The mechanically coupled EDU may be comprised of two electric machines which may function as motors and/or generators, two gear trains with one gear train adjacent to each electric machine, and a connection between the two gear trains via a disconnect (e.g., mechanical dog clutch with electrical actuation, electrically operated electromagnetic clutch, or synchronizer with electrical actuation) on auxiliary shafts. In this way, the configuration of an optional indirect connection between the two electric machines may offer greater flexibility for optimal operation during a greater variety of driving conditions than traditional EDUs in which this type of connection does not exist.

Figure 1:
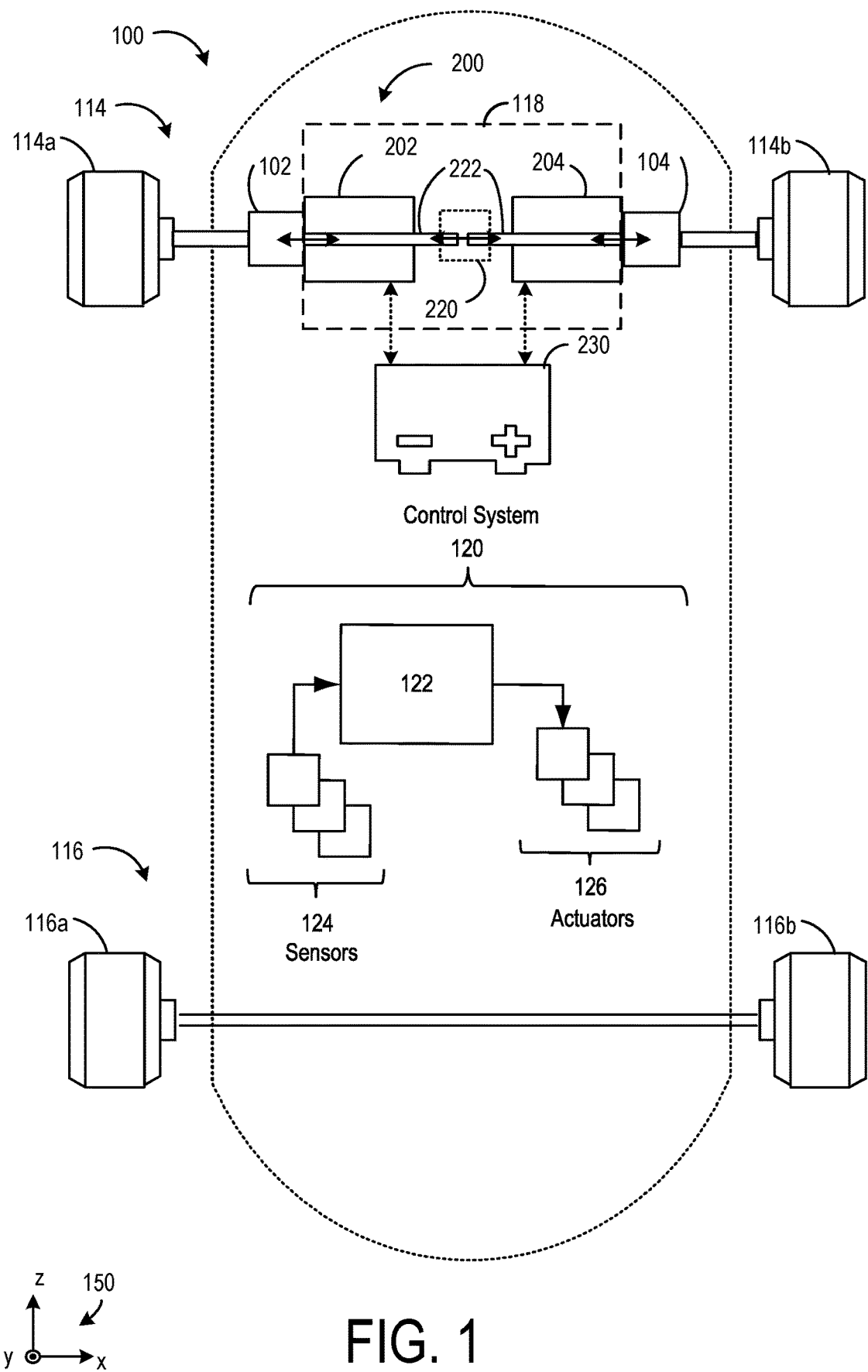
FIG. 1 shows an example vehicle with a mechanically coupled EDU.
Figure 2:
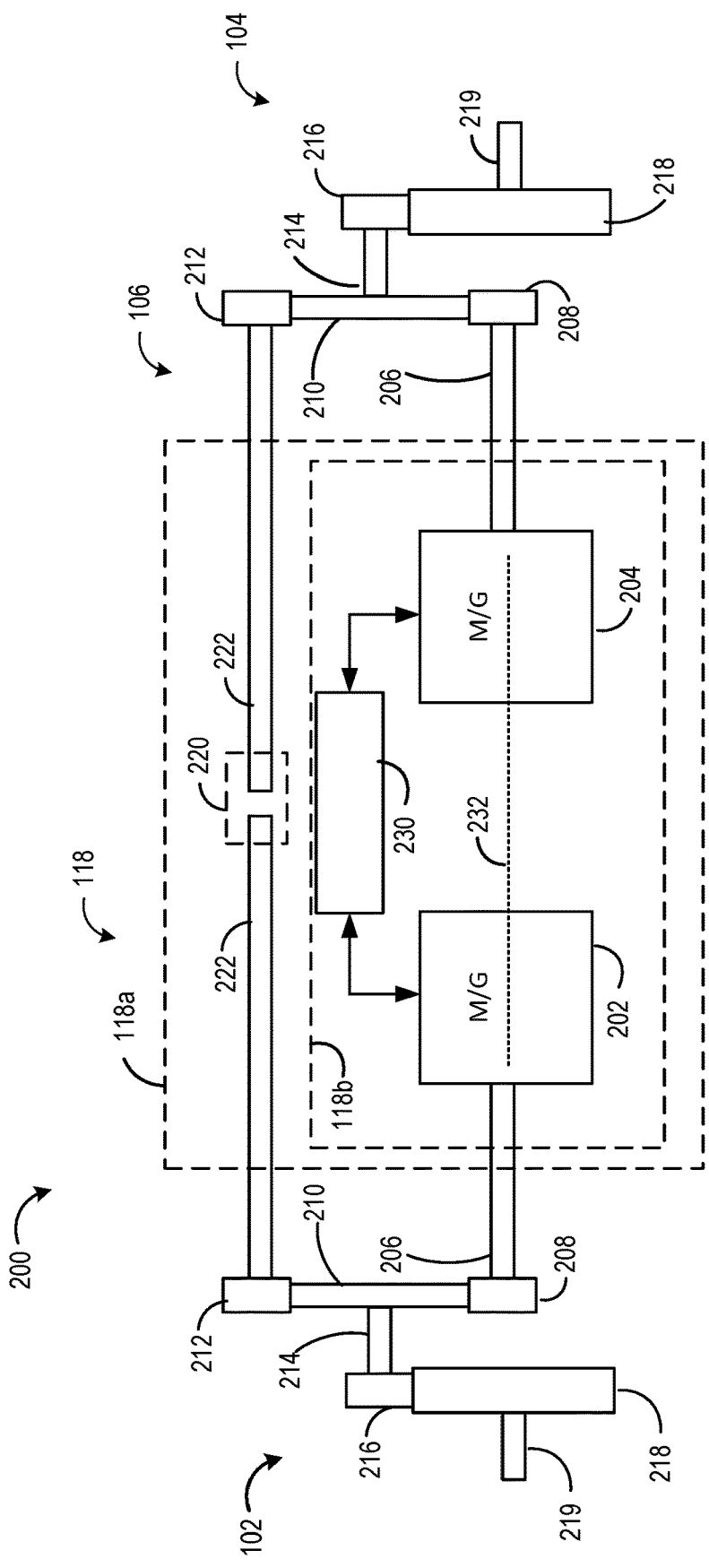
FIG. 2 shows an embodiment of the mechanically coupled EDU.
Figure 3:
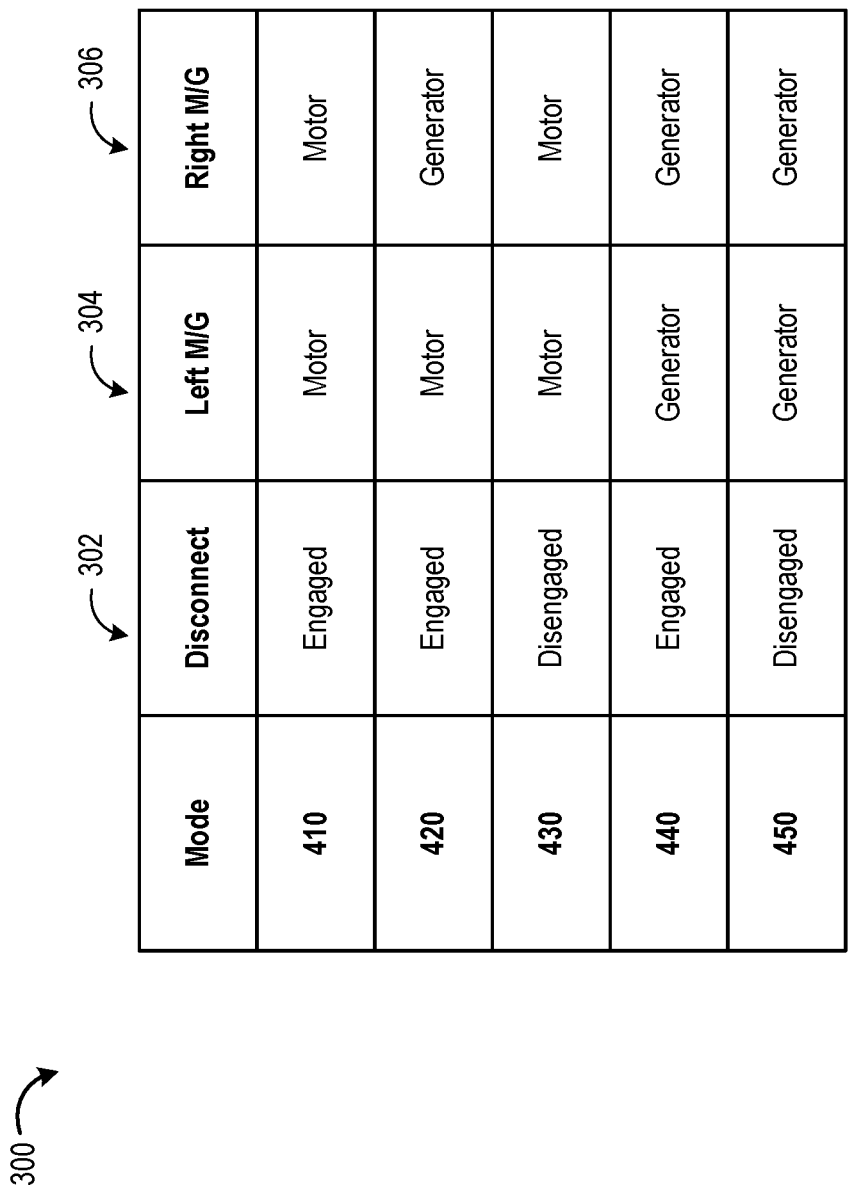
FIG. 3 shows a table of possible driving modes of the mechanically coupled EDU.
Figure 5:
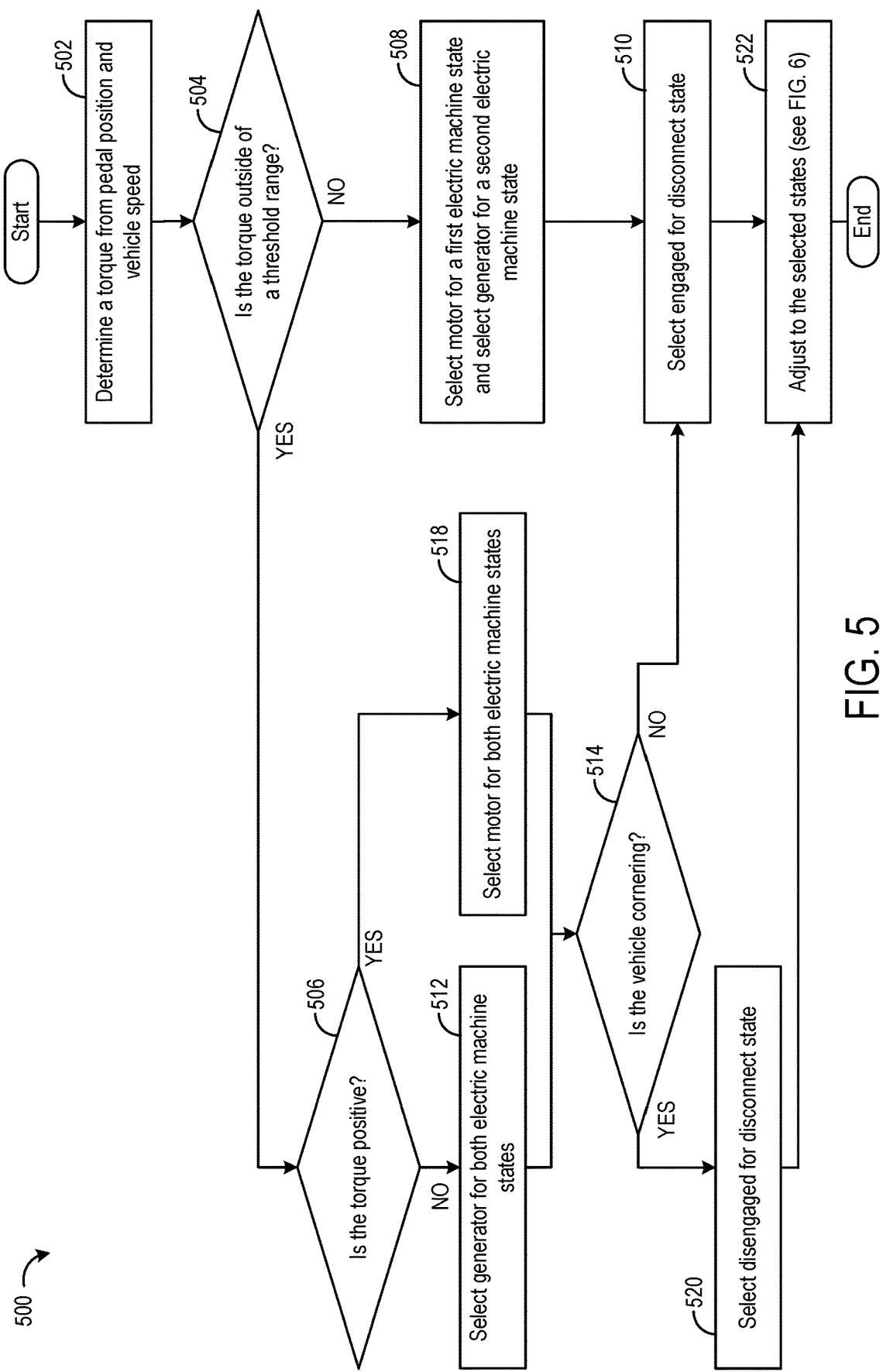
FIG. 5 shows a flowchart of a method of selecting a driving mode of a mechanically coupled EDU depending on driving conditions.
Figure 6:
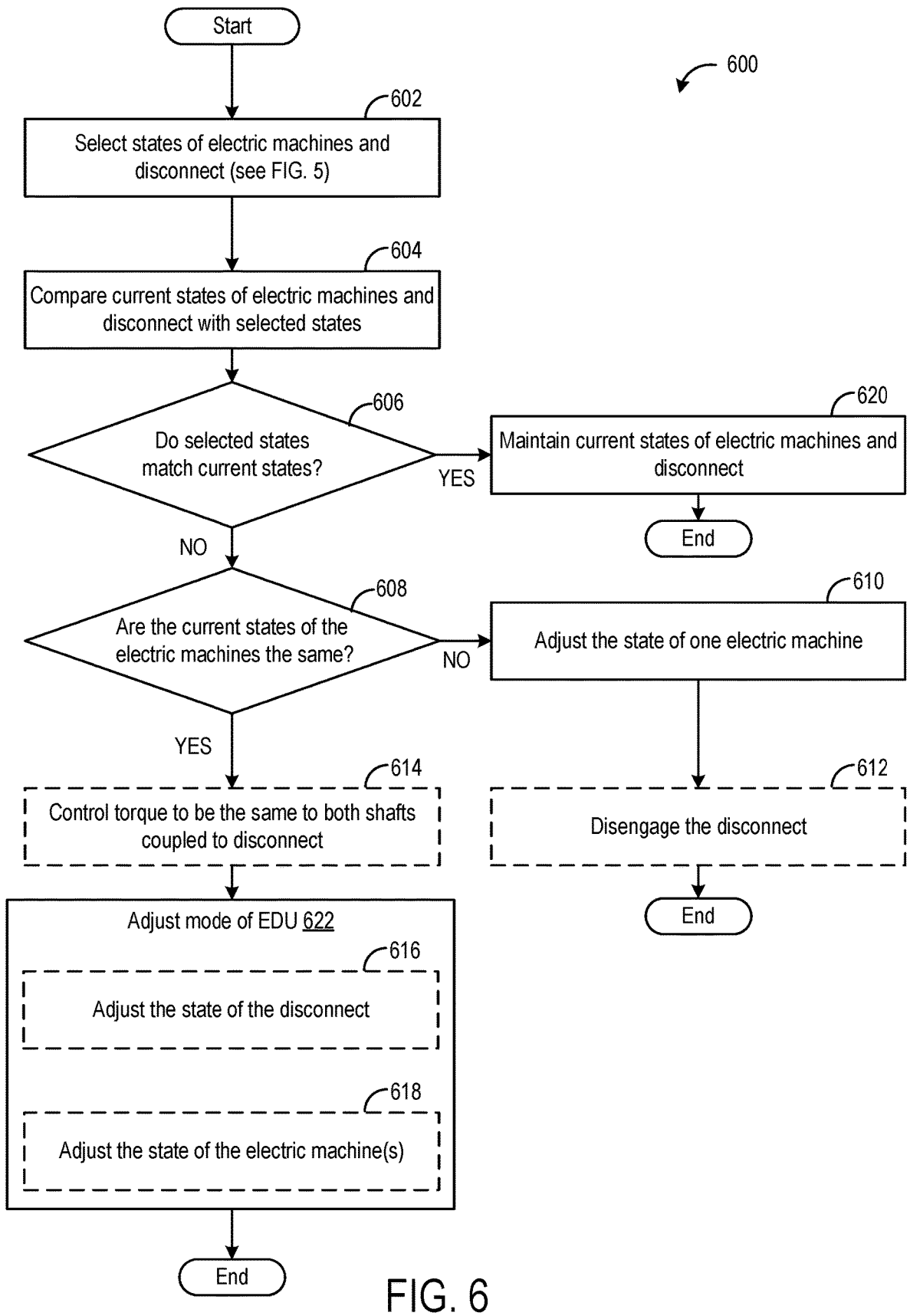
FIG. 6 shows a flowchart of a method of adjusting between different mechanically coupled EDU modes.
Figure 7:
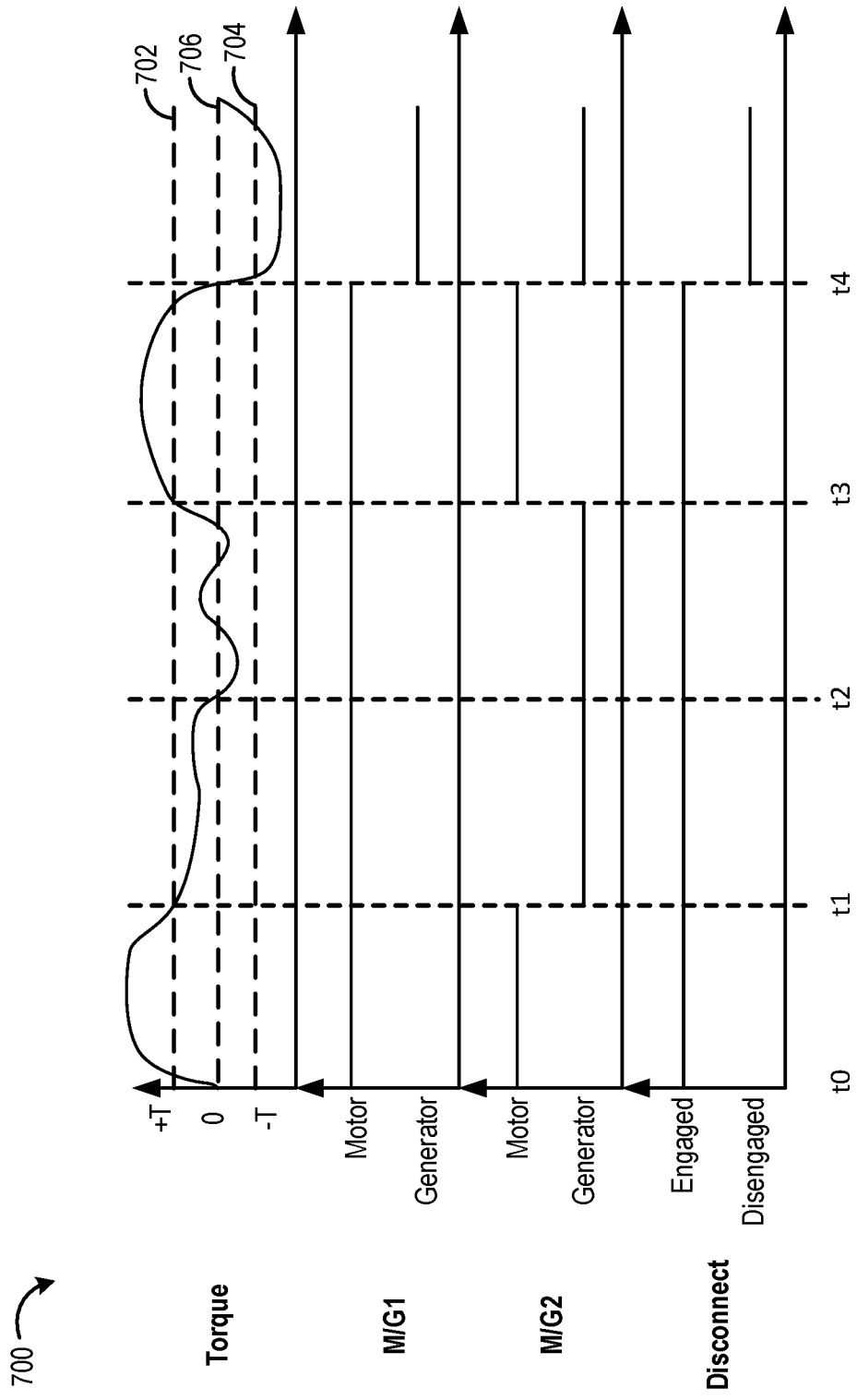
FIG. 7 shows a timing diagram of an example of dynamic driving conditions where modes of a mechanically coupled EDU may be adjusted.

FIGS. 1-7 show various aspects of a mechanically coupled EDU as well as how the mechanically coupled EDU may function within a vehicle. FIG. 1 shows an example of how the mechanically coupled EDU may be integrated in a vehicle. FIG. 2 shows an exemplary embodiment of the mechanically coupled EDU. FIG. 3 shows different driving modes with possible combinations of states of each component of the mechanically coupled EDU, and FIGS. 4A-E shows an example of power flow in the mechanically coupled EDU for each of the driving modes of FIG. 3. FIG. 5 shows a method of determining a mode depending on the driving conditions, and FIG. 6 shows a method for adjusting the mechanically coupled EDU when changing between modes. FIG. 7 shows an example of changing driving conditions and the corresponding modes that may be chosen accordingly at different time points.

FIGS. 1, 2, and 4A-E are drawn as schematic representations without a particular scale, and other relative dimensions may be used. Also, for the purpose of clarity of descriptions and figures, "left" and "right" will hereby refer to the relative directionality of parts of a mechanically coupled EDU as presented in FIGS. 1, 2, and 4A-E, however it will be understood that "left" and "right" do not limit the orientations of the parts within an EDU or within a vehicle.

Turning to FIG. 1, a schematic drawing is shown that depicts an electric vehicle 100 with a mechanically coupled EDU 200 that generates motive power for vehicle propulsion. The electric vehicle 100 may be a light, medium, or heavy duty vehicle. Specifically, in one use-case example, the electric vehicle 100 may be a passenger vehicle such as a truck, sedan, wagon, and the like. However, in other examples, the electric vehicle 100 may be an off-highway vehicle or other type of vehicle. Further, the electric vehicle 100 may be a battery electric vehicle (BEV), a series hybrid electric vehicle (HEV) that includes an internal combustion engine, or a fuel-cell electric vehicle, as non-limiting examples.

In one embodiment, the electric vehicle 100 may incorporate a mechanically coupled EDU 200. A reference axis 150 is included for comparison to FIG. 2 in further discussion below. The mechanically coupled EDU 200 may include a left electric machine 202 coupled to a left transmission 102 (e.g., a first transmission), and a right electric machine 204 coupled to a right transmission 104 (e.g., a second transmission). Arrows extending between the left and right electric machines 202 and 204 and their respective transmissions 102 and 104 indicate the mechanical power transfer capabilities of these components. The left and right electric machines 202 and 204 may be connected to a battery 230, such as to electrically couple with the battery 230. Electrical energy may be transferred between components, features, and systems that are electrically coupled. In addition, the mechanically coupled EDU 200 may include a disconnect 220, wherein the disconnect 220 may optionally mechanically couple the left components (e.g., left transmission 102 and left electric machine 202) and right components (e.g., right transmission 104 and right electric machine 204) via shafts 222. An arrow over the disconnect 220 indicates that mechanical power may be transferred between the left and right shafts 222, in either direction (e.g., from left to right or right to left). In some embodiments, shafts 222 may be coupled to gears of the left transmission 102 and right transmission 104. In some examples, the disconnect 220 may be an electrically actuated dog clutch, wherein dogs interlock to mechanically couple shafts 222. In other examples, the disconnect 220 may be an electrically actuated friction clutch, wherein friction drives the mechanical coupling of shafts 222. In some examples, the disconnect 220 may be an electrically actuated synchronizer. In yet other examples, the disconnect 220 may be a combination of a dog clutch and friction clutch, and/or other appropriate types of clutches. In some examples, the mechanically coupled EDU 200 may comprise two electric machines: electric machines 202 and 204, in a back-to-back configuration whereby the electric machines 202 and 204 are aligned coaxially and oriented facing away from each other. Electric machines 202 and 204 may be traction motors. Electric machines 202 and 204 may receive electrical power from the traction battery 230 to provide torque to front vehicle wheels 114. Front vehicle wheels 114 may include a first wheel 114a and a second wheel 114b. Electric machines 202 and 204 may also be operated as generators to provide electrical power to charge traction battery 230, for example during a braking operation. Dashed arrows extending between the electric machines 202 and 204 and the battery 230 indicate the electrical power transfer capabilities of these components. Additionally, it may be appreciated that while FIG. 1 depicts the mechanically coupled EDU 200 mounted in a front wheel drive configuration with drive shafts towards the front axles, other configurations are possible, such as employing electric machines 202 and 204 in a central axle configuration, a rear axle configuration, or in a configuration in which there is one or more EDUs included therein. For example, one EDU may be in a rear wheel drive configuration and a second EDU may be in a front wheel drive configuration.

Electric machines 202 and 204 may both be enclosed within a housing 118. In some embodiments, the housing may be housing 118a and may enclose disconnect 220 and shafts 222. In other embodiments, the housing may be housing 118b and may not enclose the disconnect 220 and shafts 222. The housing 118 may be coupled to an outside of transmission/gearbox housings. The transmission/gearbox housings may each house a transmission system 102 and 104. The transmission systems may each include one or more shafts, gears, and clutches to transfer mechanical power generated by the electric machines 202 and 204 downstream. A controller 120 may send a signal to actuator(s) of the clutches to shift respective positions of the clutches, so as to shift gears for power transmission from the electric machines 202 and 204 to the rear vehicle wheels 116 and/or the front vehicle wheels 114. Rear wheels 116 may include a third wheel 116a and fourth wheel 116b.

Controller 122 may form a portion of a control system 120. Controller 122 may include a microcomputer with components such as a processor (e.g., a microprocessor unit), input/output ports, an electronic storage non-transitory medium for executable programs and calibration values (e.g., a read-only memory chip, random access memory, keep alive memory, a data bus, and the like). The storage medium may be programmed with computer readable data representing instructions executable by a processor for performing the methods and control techniques described herein as well as other variants that are anticipated but not specifically listed. Control system 120 is shown receiving information from a plurality of sensors 124 and sending control signals to a plurality of actuators 126. For example, the sensors 124 may include a pedal position sensor designed to detect a depression of an operator-actuated pedal such as an accelerator pedal and/or brake pedal, a speed sensor at the transmission output shaft, energy storage device state of charge (SOC) sensor, clutch position sensors, and the like. Motor speed may be ascertained from the amount of power sent from an inverter to an electric machine. An input device (e.g., accelerator pedal, brake pedal, drive mode selector, combinations thereof, and the like) may further provide input signals indicative of an operator's intent for vehicle control. As another example, the actuators may include a clutch or a plurality of clutches, etc.

Upon receiving the signals from the various sensors 124 of FIG. 1, the controller 122 processes the received signals and employs various actuators 126 of vehicle components to adjust the components based on the received signals and instructions stored in the memory of controller 122. For example, the controller 122 may receive an accelerator pedal signal indicative of an operator's request for increased vehicle acceleration. In response, the controller 122 may command operation of inverters to adjust electric machine power output and increase power delivered from the electric machine(s) to the transmissions. The controller 122 may, during certain operating conditions, be designed to send commands to clutches to engage and disengage clutch gears. For instance, a control command may be sent to a clutch and in response to receiving the command, an actuator in the clutch may adjust the clutch based on the command for clutch engagement or disengagement. The other controllable components in the vehicle may function in a similar manner with regard to sensor signals, control commands, and actuator adjustment, for example.

The mechanically coupled EDU 200 may take several forms, one example of which may be mechanically coupled EDU 200 of FIG. 2. Reference axis 150 show an orientation of mechanically coupled EDU 200 in FIG. 2 (as compared to an orientation of mechanically coupled EDU 200 in FIG. 1). Mechanically coupled EDU 200 may contain two electric machines; there may be a left electric machine 202 and a right electric machine 204. The electric machines 202 and 204 may be arranged coaxially, and the electric machines 202 and 204 may therefore share a common axis of rotation 232. Both of the electric machines 202 and 204 may function as generators or motors, and may be adjusted between the states of generator and motor independently of each other. In other words, at some times, the left electric machine 202 may function as a generator while the right electric machine 204 may function as a motor. At other times, the left electric machine 202 may function as a motor while the right electric machine 204 may function as a generator. At other times, both electric machines 202 and 204 may function as motors. At other times, both electric machines 202 and 204 may function as generators. In this way, both of the electric machines 202 and 204 may be capable of drawing energy from and transferring energy to the battery 230, as indicated by arrows extending between the electric machines 202 and 204 and the battery 230.

Electric machines 202 and 204 may each comprise a rotor shaft 206, through which each electric machine may be coupled to a transmission. For example, electric machine 202 may be coupled to left transmission 102, and electric machine 204 may be coupled to right transmission 104. Both of the transmissions 102 and 104 may include one or more gears and one or more shafts, among other parts not shown for clarity. As an example, left and right transmissions 102 and 104 may each include a first gear 208 which may be coupled to rotor shaft 206. The rotor shaft 206 may be coupled to a second gear 210, the second gear 210 may be coupled to a first shaft 214, the first shaft 214 may be coupled to a third gear 216, the third gear 216 may be coupled to a fourth gear 218, and the fourth gear 218 may be coupled to an output shaft 219. For each coupling between gears (e.g., third gear 216 and fourth gear 218), it may be assumed that teeth of one gear may interlock (e.g., mesh) with teeth of the other gear. Each connection (e.g., rotational coupling) between a shaft and a gear (e.g., first shaft 214 and second gear 210), may be achieved by means of adhesive, press-fit, set screws, keyways, involute splines, cross drilled holes, and the like. The left transmission 102 may also include other parts omitted from FIG. 2 for brevity, such as one or more clutches, additional gears and shafts, and the like. Similarly, right transmission 104 may include substantially the same components as listed for transmission 102, including parts not shown in FIG. 2, with opposite orientations. In other embodiments, right transmission 104 may include a different number of gears and/or shafts than left transmission 102. Output shafts 219 may be coupled to one or more axles of a vehicle (e.g., vehicle 100), such that output shafts 219 may transfer mechanical energy from the mechanically coupled EDU 200 to wheels of the vehicle (e.g., front wheels 114 and/or rear wheels 116 of vehicle 100).

Auxiliary parts 106 may include two or more auxiliary gears and two or more auxiliary shafts. For example, auxiliary gears 212 may be coupled to the second gears 210, and auxiliary gears 212 may be coupled to auxiliary shafts 222. Auxiliary parts 106 may also include a disconnect 220. The disconnect 220 may be a dog clutch, wherein the dog clutch couples to the auxiliary shafts 222 by interlocking teeth, or dogs. The disconnect 220 may also attach to auxiliary shafts 222 by means of friction, or a combination thereof. The disconnect 220 may also be a synchronizer. The disconnect 220 may be engaged or disengaged depending on the driving conditions. When the disconnect 220 is in the engaged state, the disconnect 220 may couple to the auxiliary shafts 222 such that the disconnect 220 ensures the auxiliary shafts 222 may rotate with a same rotational speed. Thus, the left transmission 102 may be mechanically coupled to the right transmission 104 through engagement of the disconnect 220, wherein mechanical coupling distributes torque throughout the left and right transmissions, 102 and 104, respectively. Conversely, when the disconnect 220 is in the disengaged state, the disconnect may not contact with the auxiliary shafts 222, such that the auxiliary shafts 222 may rotate freely according to the torque of their respective transmissions, without interaction between the left and right transmissions, 102 and 104, respectively. In this way, the disconnect 220 being disengaged may allow torque to be controlled separately to each side of the vehicle for torque vectoring.

Turning to FIG. 3, each of the five modes of a mechanically coupled EDU (e.g., mechanically coupled EDU 200 of FIG. 2) shown in table 300 may correspond to situations that may be commonly encountered when operating a vehicle (e.g., vehicle 100 for FIG. 1) wherein the mechanically coupled EDU may be incorporated. By having several modes, the disclosed mechanically coupled EDU may be adjusted between the modes according to which mode may be most energy efficient and functional depending on driving conditions. Therefore, a higher overall energy efficiency of a vehicle may be achieved by conserving energy in driving conditions wherein previously energy has been inefficiently recaptured by EDUs and regenerative breaking. Having a higher energy efficiency may extend a range of drive for an electric or hybrid vehicle.

Table 300 shows possible combinations of a state of a disconnect shown in column 302, which may be engaged or disengaged, and a state of two electric machines in a mechanically coupled EDU; a state of a left electric machine shown in column 304, and a state of a right electric machine shown in column 306, both of which may be in a motor state or a generator state. In one example, the state of the disconnect may correspond to the disconnect 220 of mechanically coupled EDU 200, the state of the left electric machine may refer to the left electric machine 202 of mechanically coupled EDU 200, and the state of the right electric machine may correspond to the right electric machine 204 of mechanically coupled EDU 200. Additionally or alternatively, the state of the disconnect and the states of the electric machines and may correspond to substantially the same components in another embodiment of a mechanically coupled EDU without departing from the scope of this disclosure.

When the state of the disconnect is engaged, the left and right electric machines may be mechanically coupled such that torque may be distributed to both gear trains. When the state of the disconnect is disengaged, the electric machines may be separate such that each electric machine may individually provide torque to, or absorb torque from, a respective adjacent gear train, and consequently, torque vectoring may occur. Changing the state of the disconnect may be initiated by a controller (e.g., controller 122) and carried out by an actuator (e.g., actuators 126). When the state of the left electric machine is motor, the left electric machine may be applying a torque to a gear train. When the state of the left electric machine is generator, the left electric machine may be receiving torque from the gear train. Similarly, when the state of the right electric machine is motor, the right electric machine may be applying a torque to a gear train. When the state of the right electric machine is generator, the right electric machine may be receiving torque from the gear train. In other words, an electric machine in the motor state may be said to be torque generating while an electric machine in the generator state may be said to be torque absorbing. Said another way, torque relative to an electric machine may be regarded as positive when the electric machine functions as a motor, and torque may be regarded as negative when the electric machine functions as a generator. Changing the state of an electric machine may be initiated by a controller (e.g., controller 122 of FIG. 1). As described previously, changing a state of an electric machine from motor to generator and vice versa may result in energy losses due to imperfect efficiency.

In one example, the two electric machines may be considered substantially the same. Thus, disregarding redundancy with the states of the left and right electric machines respectively, there may be six combinations of the state of the disconnect, the state of the left electric machine and the state of the right electric machine. However, there may be five modes of a mechanically coupled EDU when implemented in a vehicle because when a state of one electric machine is generator, and simultaneously a state of one electric machine is motor, torque may be distributed to both sides of the vehicle if the state of the disconnect is engaged. Therefore, a combination of an electric machine in the generator state and another electric machine in the motor state with a disconnect in the disengaged state will not be discussed.

The five modes of table 300 will each be discussed below in reference to FIG. 3 and FIGS. 4A-E. Power flow corresponding to each of the modes shown in table 300 of FIG. 3 may be seen in FIGS. 4A-E. The mechanically coupled EDU 200 is used as an example embodiment where FIG. 4A shows mode 410, FIG. 4B shows mode 420, FIG. 4C shows mode 430, FIG. 4D shows mode 440, and FIG. 4E shows mode 450, however similar directions of power flow may occur in other embodiments. Each mode shown in FIGS. 4A-E may show left electric machine 202, right electric machine 204, disconnect 220, and battery 230, as well as other parts of mechanically coupled EDU 200 as shown FIG. 2 which are not labeled for clarity and will not be reintroduced. In FIGS. 4A-E, a solid arrow may show a direction of mechanical energy flow, while a dashed arrow may show a direction of electrical energy flow.

Mode 410 shown in FIG. 4A shows an example of mode 410 of FIG. 3. The state of the disconnect 220 may be engaged, and the states of the electric machines 204 and 206 may both be motor. As shown in FIG. 4A, electrical energy may be supplied by the battery 230 to both electric machines 202 and 204, wherein the electrical energy may be converted into mechanical energy in the form of torque applied to the gear trains of transmissions 102 and 104. Because the disconnect 220 may be engaged, mechanical energy may be distributed in both directions through the shafts of which the disconnect 220 is coupled to (e.g., auxiliary shafts 222 of FIG. 2). In this way, the drive unit may be balanced and stable, with torque distributed to wheels on both sides of the system in mode 410. This mode may be useful when supplying high power to the ground while preventing torque vectoring may provide stability, such as when the vehicle may be climbing a hill and/or being driven on loose terrain, and/or launching from rest with different levels of frictional force applied to the wheels (e.g., wheels 114 and/or 116 in vehicle 100 of FIG. 1) by the surface on which the vehicle may be driven. In this example, mode 410 may also allow one side to experience higher torque than one motor may provide due to the distribution of torque, and the existence of such a mode is an advantage of a mechanically coupled EDU over other EDUs.

Mode 420 may demonstrate another advantage of mechanically coupled EDUs (e.g., mechanically coupled EDU 200 of FIG. 2) over other twin EDUs; the electric machines may switch states between generator and motor independently of each other. FIG. 4B, shows an example of mode 420 of mechanically coupled EDU 200, wherein the left electric machine 202 may be in the motor state while the right electric machine 204 may be in the generator state. In other examples of mode 420 of mechanically coupled EDU 200, the left electric machine 202 may be in the generator state while the right electric machine 204 may be in the motor state. A similar power flow may occur in either example of mode 420. The battery 230 may supply the left electric machine 202 with electrical energy to be converted to mechanical energy in the form of torque applied to the gear train of transmission 102 via rotor shafts as discussed above with regards to FIG. 2 above. The state of the disconnect 220 may be engaged, so torque may be distributed throughout the drive unit of mode 420 in order to apply torque to the wheels. Because the disconnect 220 may be engaged, mechanical energy may be distributed in one direction through the shafts of which the disconnect 220 is coupled to (e.g., auxiliary shafts 222 of FIG. 2). In this way, torque may be distributed to both sides of the system in mode 410, from the left electric machine 202 but not from the right electric machine 204. Torque may also be received by the right electric machine 204 which may convert the mechanical energy into electrical energy to be transferred from electric machine 204 to battery 230 for storage.

The power flow of mode 420 may be advantageous during driving situations in which electric machines of traditional EDUs may be adjusted between generator and motor states repeatedly. Additionally or alternatively, mode 420 may be useful when driving conditions may demand no more power than the amount which a single motor (e.g., electric machine 202) may provide. Additionally or alternatively, mode 420 may be used at vehicle speeds where it may be more efficient for one motor to supply an amount of torque than for two motors to each apply half of the amount of torque due to dependency of motor efficiency on speed. In this case, energy may be saved due to higher efficiency of motor function. For example, when coasting on a highway, traditional EDUs may switch both electric machines from motors to generators when an acceleration pedal is not depressed, and switch both electric machines back to motors when the pedal is depressed again. As explained above, each switch of each electric machine from torque generation to torque absorption results in energy losses. Thus, because coasting on a highway demands short periods of slight acceleration with the intention of maintaining a relatively similar speed over a long period of time, the constant switching of electric machines from motors to generators and vice versa can be an inefficient use of energy. In contrast, mode 420 may be more energy efficient while coasting on highway because the option of using a generator and motor are both available simultaneously, and the amount of power needed may be less than the maximum of one motor. By having mode 420, the states of the electric machines may be adjusted less often as a motor and generator are both readily available in this mode, resulting in less energy lost to adjust electric machines from motor to generator and vice versa. Additionally, according to the efficiency dependence of the motors on speed and torque, a higher efficiency may be achieved by operating one motor (e.g., mode 420) as compared to two motors (e.g., mode 410).

One disadvantage of mode 420 is the loss of energy between each conversion of energy type, resulting in an imperfect energy efficiency despite recapturing some through means of the electric machine 204 acting as a generator. In other words, because the electric machines may not have perfect efficiency when acting as motors or generators, each transformation of energy from mechanical to electrical and vice versa results in energy losses. Therefore, the determination of electric machine states may take into account energy losses due to energy conversion (e.g., efficiency of motor and generator states), in addition to energy losses due to switching between electric machine states. Said another way, the efficiency of continuously converting energy between mechanical and electrical energy within mode 420 may be compared to the efficiency of repeatedly changing between modes using two motors (e.g., modes 410 and 430) and modes using two generators (e.g., modes 440 and 450) to determine when mode 420 is advantageous over other modes. Additionally, mode 420 prevents torque vectoring as the disconnect 220 is engaged, so in driving conditions where torque vectoring may increase vehicle performance according to road curvature, mode 420 may not be desired. An example of a method to determine a mode according to driving conditions will be discussed further below with regards to FIG. 5.

In mode 430, the state of the disconnect may be disengaged, and the states of the left and right electric machines, may both be motor. As shown in FIG. 4C, electrical energy may be supplied by battery 230 to both electric machines 202 and 204. Electric machines 202 and 204 may then convert the energy supplied by the battery 230 into mechanical energy by applying torque to their respective gear trains (e.g., transmissions 102 and 104 which are labeled in FIG. 2) via rotor shafts (e.g., rotor shafts 206). Because the disconnect 220 may be disengaged, torque may cause auxiliary shafts to rotate, however, as shown by arrows designating the flow of mechanical power, torque may not be transferred between the shafts on which the disconnect is placed. As such, the shafts may rotate with different rotational speeds. In other words, in mode 430, up to the maximum power of a single motor may be separately applied to both gear trains, and torque vectoring may occur. Mode 430 may be appropriate for when a vehicle may be cornering. Additionally or alternatively, mode 430 may be advantageous when frictional forces from the ground may not be equivalently applied to each wheel, specifically when the right and left wheels experience different frictional force magnitudes. Additionally or alternatively, mode 430 may be used when high power is demanded to the ground. As examples, mode 430 may be selected when a vehicle (e.g., vehicle 100) with a mechanically coupled EDU (e.g., mechanically coupled EDU 200) may be accelerating while turning sharply, and/or when the vehicle with the mechanically coupled EDU may be accelerating on an uneven surface with varying friction across the area of contact with wheels.

In mode 440, the state of the disconnect may be engaged, and the states of the left and right electric motors may both be generator. As shown in FIG. 4D, mechanical energy flows through gear trains (e.g., transmissions 102 and 104) to electric machines 202 and 204 where electrical energy may be generated by the electric machines 202 and 204, and that energy may be transferred to battery 230. Mechanical energy may also be transferred between left and right components through the auxiliary shafts (e.g., auxiliary shafts 222) because the disconnect 220 may be engaged. As such, torque may be distributed throughout the mechanically coupled EDU. Thus, mode 440 may correspond to a driving situation wherein the vehicle may be decelerating and torque vectoring may not be needed. For example, a vehicle (e.g., vehicle 100) in mode 440 may be slowing down in a straight path. When torque vectoring is not needed, engaging the disconnect may increase the stability of the vehicle and decrease risk of malfunction (e.g., wheels misaligning).

In mode 450 as introduced in table 300 of FIG. 3, the states of the left and right electric motors may be generator, but the state of the disconnect may be disengaged. As shown in FIG. 4E, the corresponding power flow may include mechanical energy directed towards the electric machines 202 and 204. At the electric machines 202 and 204, mechanical energy may be converted to electrical energy which may be transferred for storage in battery 230. Additionally, mechanical energy may be transferred to auxiliary gears and shafts (e.g., auxiliary gears 212 and auxiliary shafts 222), however similar to mode 430, the disconnect being disengaged prevents energy flow to be transferred between the left and right auxiliary parts. Thus, the left and right electric machines may be controlled independently, and torque vectoring may occur. Therefore, a vehicle (e.g., vehicle 100) with a mechanically coupled EDU (e.g., mechanically coupled EDU 200) may use mode 450 when breaking, and when torque vectoring may be needed. Examples of such driving conditions include cornering while breaking, and/or decelerating on a surface with inconsistent friction factor across the area of contact with wheels of the vehicle.

Turning to FIG. 5, a method 500 for selecting a mode from FIG. 3-4E is shown. For example, the method 500 may be implemented by a mechanically coupled EDU described above (e.g., mechanically coupled EDU 200 of FIG. 1 and FIG. 2). In other examples, the method 500 may be implemented by other embodiments of mechanically coupled EDUs. Method 500 may be executed by a controller (e.g., controller 122 of FIG. 1), according to instructions in memory of the controller communicatively coupled to the EDU and signals received from vehicle sensors (e.g., sensors 124 of FIG. 1). As such, other methods than method 500, including variations of method 500, may be used depending on programming of the controller. In other words, method 500 is a non-limiting example of a method that may be used to determine a desired mode of a mechanically coupled EDU according to driving conditions. At any end of method 500, a state has been selected for a disconnect and both electric machines of a mechanically coupled EDU. As such, a corresponding mode exists in table 300 of FIG. 3 to match the results of method 500.

Method 500 begins at 502, wherein a torque is determined (e.g., calculated, estimated) from conditions such as pedal positions (e.g., acceleration pedal, brake pedal) and vehicle speed. A controller (e.g., controller 122) may carry out the demanded steps according to its internal non-transitory memory and signals from sensors (e.g., sensors 124) in order output a determined torque. The determined torque may be the torque to be applied to the system by one or more of the electric machines in the mechanically coupled EDU. Accordingly, a positive torque may indicate that electric machine(s) may apply torque to the gear train(s), while a negative torque may indicate that electric machine(s) may absorb torque from the gear train(s).

At 504, the method determines if the determined torque is outside of a threshold range. The threshold range may be bound by the maximum torque an electric machine of the mechanically coupled EDU may apply to, and the maximum torque the electric machine may receive from, a gear train. In this way there may be a positive and negative threshold value with the threshold range therebetween. The threshold values may be calculated by the controller from a variety of factors, including electric machine properties and vehicle speed. Accordingly, because electric machine efficiency depends on vehicle speed, the threshold values may be a function of vehicle speed. As such the threshold values may change dynamically with the system conditions, and thus the threshold value may be calculated at each iteration of method 500. The threshold values may alternatively be a constant predetermined value programmed into the memory of the controller.

If the magnitude of the determined torque is not outside of a threshold range (NO), the method proceeds to 508 and selects motor for a first electric machine state and selects generator for a second electric machine state. Because the electric machines may be mechanically coupled in order to distribute torque to both sides of the vehicle when the electric machines are in different states (e.g., one electric machine in the generator state and another in the motor state), method 500 subsequently selects disengaged for a disconnect state at 510, and method 500 ends. Thus, the corresponding mode may be mode 430.

Conversely, if the magnitude of the determined torque is outside of a threshold range (YES), method 500 proceeds to 506, wherein the method judges whether the determined torque is positive. As defined previously, a positive torque indicates that mechanical power is flowing from an electric machine to a transmission, while a negative torque indicates that mechanical power is flowing towards an electric machine from a transmission. A controller (e.g., controller 122) may make this decision by examining the results of 502, wherein the torque was determined.

If the torque is not positive (NO), or in other words, the torque is negative or zero, the method 500 proceeds to 512. Accordingly, at 512 the method selects motor for both electric machine states of the mechanically coupled EDU. In this case, the vehicle may be decelerating (e.g., due to a depressed brake pedal), and torque may be transferred from gear trains (e.g., transmissions 102 and 104 of mechanically coupled EDU 200) to the electric machines (e.g., electric machines 202 and 204) where energy may be converted from mechanical to electrical energy, and stored in a battery (e.g., battery 230 from mechanically coupled EDU 200). As such, this may correspond to mode 410 or 430.

Alternatively, if the torque is positive (YES), the method proceeds to 518, wherein the method 500 selects motor for both electric machines states of the mechanically coupled EDU. Therefore, this may correspond to mode 440 or 450.

Next, at 514, method 500 determines if the vehicle is cornering. This final decision narrows the mode choices for the driving conditions from two options, as described in regards to steps 512 and 518, to a single mode. The controller (e.g., controller 122) may take inputs from sensors (e.g., sensors 124) and/or input devices (e.g., steering wheel), in order to provide an output for 514.

If the vehicle is cornering (YES), method 500 accordingly selects disengaged for disconnect state at 520. The disengagement of the disconnect allows for torque vectoring which, as discussed above, can increase vehicle performance while cornering.

Alternatively, if the vehicle is not cornering (NO), method 500 selects engaged for disconnect state at 510. As discussed previously, in conditions where torque vectoring may not be useful, such as driving along a straight pathway, having the disconnect be engaged may stabilize the vehicle, and allow for increased performance on surfaces with inconsistent frictional factor over the area of contact with wheels of the vehicle.

Following 520 or 510, method 500 proceeds to 522, which includes adjusting to the selected states. The selected states include the state selected for each of the disconnect and both electric machines, from previous steps of method 500. A method of adjusting states is shown in FIG. 6. After adjusting states at 522, method 500 ends.

Thus, after completing method 500, the controller has selected states of the disconnect and the two electric machines of the mechanically coupled EDU according to driving conditions, and adjusted to a corresponding mode as shown in FIG. 3 and FIGS. 4A-E through method 600 of FIG. 6.

Method 600 as shown in FIG. 6. may be implemented by a mechanically coupled EDU described above (e.g., mechanically coupled EDU 200). Method 600 as shown in FIG. 6 may be executed by a controller (e.g., controller 122 of FIG. 1) by employing actuators (e.g., actuators 126) to adjust states of a disconnect and/or electric machine(s) of a mechanically coupled EDU as needed. The method 600 is an example of how a vehicle may adjust between modes of a mechanically coupled EDU, and a controller may use method 600, and/or variations of method 600, and/or other methods for similar purposes. The controller may continuously repeat method 600 on a given interval. For example, with a one second interval, the controller may start method 600 at a first time, and react as demanded to reach an end of method 600 before restarting the method again one second after the first time, although other intervals may be employed. In this way, consistent assessment of driving conditions may be achieved. Additionally or alternatively, the controller may start method 600 in response to a particular signal from a sensor. For example, if the sensors detect that there has been a change in one or more driving conditions and/or input devices (e.g., pedal positions, steering wheel rotation, friction to wheels, and vehicle speed) the controller may start the method 600 in response to the change. In this way, an adjustment in states of the components of the mechanically coupled EDU may occur more quickly.

At 602, the method 600 selects states of electric machines and disconnect. The process of which the controller may employ to determine the next states may follow method 500 of FIG. 5, which may result in the selected states of the disconnect and of the electric machines. Other methods than method 500 may also be used to reach the same results.

Following 602, at 604, the method 600 compares the current states of the electric machines and disconnect with the selected states from 602. The current states may be pulled from the memory of the controller from a previous run of method 600. Additionally or alternatively, the controller may find the current states from signals form one or more sensors. In one example, sensors may communicate that the vehicle is cornering, and as a result the controller may select the state of the disconnect through method 500 to be disengaged to allow for torque vectoring. The controller may then examine the current state of the vehicle to determine if the disconnect state is currently engaged or disengaged, and compare with the selected disengaged state.

At 606, the method 600 judges whether the selected states match the current states. 606 may take into account the comparison of 604. Specifically, at this step the method 600 seeks to determine if any of the current states do not match the determined next states from 602.

If at 606 the selected states match the current states (YES), then method 600 proceeds to 620 where current states of electric machines and disconnect are maintained. The controller may not adjust the states of the disconnect or electric machines of the mechanically coupled EDU within the vehicle to reach the selected states from 602. In other words, the current mode according to table 300 in FIG. 3 is the same as the selected mode. Thus, no adjustments may be made to the mechanically coupled EDU for optimal performance according to current driving conditions. Following 620, method 600 ends.

Alternatively, if at 606 the selected states do not match the current states (NO), or in other words, the current mode according to table 300 in FIG. 3 is not the same as the selected mode from 602. Consequently, adjustments to the mechanically coupled EDU may be made (e.g., adjustments in the state of the disconnect and/or one or more electric machines) to increase performance of the vehicle. The method 600 proceeds to 608, where the method 600 assess the current states of the electric machines, and whether or not they are in the same state.

If for a first case at 608, the two electric machines are not currently in the same state (NO), the current states of electric machines may be that the left electric machine is motor while the right electric machine is generator, or vice versa. Thus, the vehicle is currently in mode 420 of table 300 in FIG. 3, as no other modes include mismatched electric machine states. To adjust to another mode, the state of one of the two electric machines may be adjusted.

Thus, method 600 proceeds to 610 where the state of one electric machine is adjusted according to the comparison at 604. For example, if the right electric machine is in the generator state and the left electrical machine is in the motor state (e.g., mode 420 of FIG. 3 and FIG. 4), and the selected mode includes two motors (e.g., mode 410 and mode 430 of FIG. 3 and FIG. 4), then the left electrical machine may be adjusted to motor. Adjusting between the states of the electric machine may include a controller (e.g., controller 122 of FIG. 1) sending a signal to change the direction of energy flow to or from the battery (e.g., battery 230).

Next, the method 600 proceeds to 612, which includes disengaging the disconnect. However, 612 is dependent on the comparison of 604. For example, because the current state of the disconnect is engaged in mode 420, if the selected state of the disconnect is also engaged, 612 may not be executed. Conversely, if the selected state of the disconnect is disengaged, then the controller may adjust the disconnect to be disengaged. Following the optional adjustment of the disconnect, method 600 ends as the selected mode has been reached, according to the selected states from 602.

Returning to 608, alternatively, if for a second case the two electric machines are currently in the same state (YES) and the method 600 proceeds to 614 wherein torque is controlled to be the same or similar to both shafts coupled to disconnect. In other words, the rotation of the shafts (e.g., auxiliary shafts 222 of FIG. 2) are synchronized to achieve shaft speed difference is zero and/or within an acceptable range. This step is dependent on the current state of the disconnect. If the disconnect is engaged, 614 may not be executed because torque is already distributed appropriately in that configuration, and rotation of the shafts is synchronized. If the disconnect is disengaged, 614 may be performed in order to engage the disconnect. Additionally, if the disconnect is not a synchronizer (e.g., the disconnect is a dog clutch or appropriate electrically actuated electromagnetic clutch), 614 may be completed to ensure a speed difference between shafts is within the acceptable range for smooth engagement of the disconnect. Alternatively, if the disconnect is a synchronizer, 614 may not be performed.

Method 600 proceeds to 622 which includes adjusting the EDU mode with 616 and/or 618. At 616, method 600 optionally includes changing the state of the disconnect. For example, if the current state of the disconnect is engaged, and the next state of the disconnect as determined at 602 is disengaged, the state of the disconnect is adjusted to disengaged. In another example, if the current state of the disconnect is engaged, and the next state of the disconnect is also engaged, step 616 is skipped. In other words, step 616 is executed if the comparison at 604 finds that the current state of the disconnect is not the same as the next state of the disconnect. At 618, method 600 optionally includes changing the states of one or more electric machines. Similar to 616, 618 is executed if the comparison at 604 finds that the current states of the electric machines are not the same as the next states of the electric machines. Method 600 ends.

At each end of method 600, the selected mode has been reached according to the results of 602 so that the vehicle may operate optimally. The selected mode may become the current mode for the next iteration of method 600. The cycle may continue in this way throughout the operating time of the vehicle as directed by the controller according to a regular interval and/or sensed driving conditions.

Turning to FIG. 7, a timeline diagram 700 (e.g., a timing diagram) is shown for an example of driving conditions of a vehicle (e.g., vehicle 100) where a mechanically coupled EDU (e.g., mechanically coupled EDU 200 of FIG. 1 and FIG. 2) may be transitioning between modes. The timeline diagram 700 is one example of a set of dynamic driving conditions that may cause adjustments between modes of a mechanically coupled EDU, however diagram 700 does not limit the order of modes in which a vehicle may operate or the driving conditions which may cause an adjustment to a certain mode. The timeline diagram 700 shows a torque (e.g., the torque determined at 502 of method 500 of FIG. 5) with horizontal lines 702 and 704 marking torque threshold values +T and −T, and a horizontal line 706 marking zero torque. Thus, the values between horizontal lines 702 and 704 may be within a threshold range (e.g., threshold range in 504 of method 500 of FIG. 5). The threshold values +T and −T may be equal and opposite, or the threshold values may not be additive inverses of one another. The threshold values +T and −T may be constant values depending on properties of the electric machines (e.g., maximum power output, efficiency, size, etc.). For example, the threshold value +T may bet set according to a maximum torque generation capacity of a single electric machine functioning as a motor. Similarly, the threshold value −T may be set according to a maximum torque absorption capacity of a single electric machine functioning as a generator. Additionally or alternatively, the threshold values +T and −T may be determined by a function of dynamic factors such as vehicle speed in addition to properties of the electric machines listed above. As such, threshold values +T and −T may not be constant, in contrast with the horizontal lines 702 and 704 being linear and showing constant threshold values. M/G1 may correspond to the state of an electric machine (e.g., left electric machine 202 of mechanically coupled EDU 200 of FIG. 1 and FIG. 2) and M/G2 may correspond to the state of a second electric machine (e.g., right electric machine 204 of mechanically coupled EDU 200 of FIG. 1 and FIG. 2). Disconnect as in timeline diagram 700 may correspond to the state of the disconnect 220 of mechanically coupled EDU 200.

Between t0 and t1, the vehicle may be accelerating because torque is positive. As explained in regards to method 500, because torque exceeds +T, both electric machines M/G1 and M/G2 may be in the motor state. In one example, the vehicle may be accelerating (e.g., from rest or a relatively slow speed) to a relatively higher speed. In such an example, the vehicle may also be driving on a path without sharp curves where torque vectoring is not helpful in directing the vehicle, so the disconnect may be engaged. As such, between t0 and t1, the mechanically coupled EDU may be in mode 410 of FIG. 3 and FIG. 4A.

At t1, the torque drops back below the threshold value +T. Here, the vehicle may be coasting on a highway where positive torque may be needed to maintain a target speed, however the power of one motor may be adequate to provide enough torque at the target speed. Therefore, one electric machine, M/G2, may be adjusted to function as a generator at some time between t1 and t2 through method 600 of FIG. 6 such that the mechanically coupled EDU may be adjusted from mode 410 to mode 420 of FIG. 3 and FIG. 4B.

At t2, torque becomes negative, and the vehicle may be slowing down slightly while still coasting on a highway. The torque stays between the threshold values +T and −T, so the vehicle may remain in mode 420, thereby reducing energy losses by half compared to switching both electric machines to generators as in traditional EDU systems. In this example, energy may stop being supplied to M/G1 from a battery (e.g., battery 230 of mechanically coupled EDU 200), and M/G2 may absorb torque to transfer energy to the battery. Then, as more positive torque is demanded to maintain speed (e.g., when torque becomes positive again between t2 and t3), the power to M/G1 may be increased, requiring no adjusting of electric machine states so long as the torque demanded does not exceed the maximum torque one motor may be able to provide to the system (e.g., threshold value +T). Next, when torque becomes negative for a second time between t2 and t3, M/G1 may cease to be powered by the battery again, and M/G2 may be able to continue to direct energy to the battery, without energy losses due to adjusting states of electric machines. This cycle may continue during coasting while one motor is sufficient to supply enough torque to the system for desired acceleration of the vehicle and one generator is sufficient for regenerative breaking. In summary, while coasting on a highway, such as between times t1 and t3, it may be possible to remain in mode 420, even while torque fluctuates between positive and negative. In this way, energy may be conserved by not adjusting between electric machine states as many times as would be demanded for vehicles with other EDUs than a mechanically coupled EDU as disclosed herein.

At t3, the torque exceeds +T, so M/G2 may be adjusted back to motor, meaning the mode may be adjusted from 420 to 410 by means of method 600. As an example, the vehicle may be climbing a hill which demands more motive force to propel the vehicle, and therefore both motors may be needed to reach adequate torque.

Finally, at t4, the mode may be adjusted from 410 to 450 of FIG. 3 and FIG. 4. Driving conditions which may cause such an adjustment may include an operator breaking to stop quickly in response to external conditions, and/or breaking while cornering because torque vectoring may be enabled while the disconnect is disengaged.

The technical effect of methods 500 and 600 for selecting and adjusting states of components of the mechanically coupled EDU disclosed herein is to increase energy efficiency of a vehicle incorporating the mechanically coupled EDU in order to extend range of drive of the vehicle. Another technical effect of the mechanically coupled EDU set forth herein is to refine functionality of the vehicle by having multiple modes more specific to a variety of driving conditions.

The disclosure also provides support for an electric drive unit, comprising, a housing, a first electric machine and a second electric machine, each arranged within the housing, a first transmission coupled to the first electric machine and a second transmission coupled to the second electric machine, and a disconnect arranged between a shaft coupled to the first transmission and a shaft coupled to the second transmission, wherein the disconnect is configured to mechanically couple the first transmission and the second transmission. In a first example of the system, the disconnect is arranged within the housing. In a second example of the system, optionally including the first example, the disconnect is arranged outside the housing. In a third example of the system, optionally including one or both of the first and second examples, the shaft of the first electric machine and the second electric machine are arranged within the housing. In a fourth example of the system, optionally including one or more or each of the first through third examples, the wherein the shaft of the first electric machine and the shaft of the second electric machine are outside the housing. In a fifth example of the system, optionally including one or more or each of the first through fourth examples, the first electric machine and the second electric machine share a common axis of rotation. In a sixth example of the system, optionally including one or more or each of the first through fifth examples, the electric drive unit further comprises a controller including instructions stored in non-transitory memory that when executed cause the controller to: select a mode of the electric drive unit, and adjust the disconnect between an engaged state and a disengaged state and the first electric machine and the second electric machine between a generator state and a motor state based on the selected mode.

The disclosure also provides support for a method for operating an electric drive unit of a vehicle, comprising: selecting a first mode of the electric drive unit, the electric drive unit include a first electric machine and a second electric machine positioned within a housing, wherein the first electric machine is mechanically coupled to the second electric machine via a clutch, and in response to selecting the first mode, adjusting the clutch to an engaged state, the first electric machine to a motor state and the second electric machine to a generator state. In a first example of the method, the method further comprises: selecting the first mode in response to determining a torque within a threshold range. In a second example of the method, optionally including the first example, the method further comprises: selecting a second mode of the electric drive unit in response to determining a positive torque outside a threshold range and the vehicle is not cornering, and in response to selecting the second mode, adjusting the first electric machine and the second electric machine to the motor state and the clutch to the engaged state. In a third example of the method, optionally including one or both of the first and second examples, the method further comprises: selecting a third mode of the electric drive unit in response to determining a positive torque outside a threshold range and the vehicle is cornering, and in response to selecting the third mode, adjusting the first electric machine and the second electric machine to the motor state and the clutch to a disengaged state. In a fourth example of the method, optionally including one or more or each of the first through third examples, the method further comprises: selecting a fourth mode of the electric drive unit in response to determining a negative torque outside a threshold range and the vehicle is not cornering, and in response to selecting the fourth mode adjusting the first electric machine and the second electric machine to the generator state and the clutch to the engaged state. In a fifth example of the method, optionally including one or more or each of the first through fourth examples, the method further comprises: selecting a fifth mode of the electric drive unit in response to determining a negative torque outside a threshold range and the vehicle is cornering, and in response to selecting the fifth mode adjusting the first electric machine and the second electric machine to the generator state and the clutch to a disengaged state.

The disclosure also provides support for a vehicle, comprising, a first wheel and a second wheel, an electric drive unit including a first transmission coupled to the first wheel and second transmission coupled to the second wheel, a first electric machine coupled to the first transmission and a second electric machine coupled to the second transmission, wherein the first electric machine is coupled the second electric machine via shafts and a disconnect, and a controller including instructions stored on non-transitory memory that when executed cause the controller to: determine a torque of the vehicle, select a mode of the electric drive unit, the mode including a state of the first electric machine, a state of the second electric machine, and a state of the disconnect in response to the determined torque, and adjust states of the first electric machine, second electric machine, and disconnect according to the selected mode. In a first example of the system, the controller adjusts the state of the first electric machine and the second electric machine between a motor state and a generator state in response to a sign of the determined torque and the determined torque compared to a threshold range. In a second example of the system, optionally including the first example, the instructions further cause the controller to determine if the vehicle is cornering and the controller adjusts the state of the disconnect between engaged and disengaged in response to a magnitude of the determined torque compared to threshold range and based on the vehicle cornering or not cornering. In a third example of the system, optionally including one or both of the first and second examples, the instructions further include to select a mode of the electric drive unit wherein the first electric machine and the second electric machine are in different states in response to the determined torque within a threshold range. In a fourth example of the system, optionally including one or more or each of the first through third examples, the electric drive unit further includes a housing and the first electric machine and the second electric machine are arranged within the housing. In a fifth example of the system, optionally including one or more or each of the first through fourth examples, the first electric machine is coupled to the second transmission when the disconnect is in an engaged state. In a sixth example of the system, optionally including one or more or each of the first through fifth examples, instructions to select the mode of the electric drive unit further comprise to determine if the torque is positive or negative and to determine if the vehicle is cornering.

In an alternate embodiment, a method for operating an electric drive unit of a vehicle, comprising: determining a torque of the vehicle, in response to the torque within a threshold range, selecting a mode of the electric drive unit, wherein a first electric machine of the electric drive unit is in a motor state and a second electric machine of the electric drive unit is in a generator state, and adjusting the electric drive unit to the selected mode. In a first example of the method, the method further comprises: in response to the torque within the threshold range, selecting the mode of the electric drive unit wherein a disconnect of the electric drive unit is in an engaged state. In a second example of the method, optionally including the first example, the method further comprises: in response to the torque outside of the threshold range determining if the torque is positive and in response to determining the torque is positive, selecting a mode of the electric drive unit wherein the first electric machine and the second electric machine are in the motor state. In a third example of the method, optionally including one or both of the first and second examples, the method further comprises: in response to determining the torque is negative selecting a mode of the electric drive unit wherein the first electric machine and the second electric machine are in the generator state. In a fourth example of the method, optionally including one or more or each of the first through third examples, the method further comprises: determining if the vehicle is cornering, and in response to determining the vehicle is cornering, selecting a mode of the electric drive unit wherein a disconnect of the electric drive unit is in a disengaged state. In a fifth example of the method, optionally including one or more or each of the first through fourth examples, in response to determining the vehicle is not cornering, selecting a mode of the electric drive unit wherein the disconnect is in an engaged state.

FIGS. 1, 2, and 4A-E show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electric drive unit, comprising:
   a housing;
   a first electric machine and a second electric machine, each arranged within the housing;
   a first transmission coupled to the first electric machine and a second transmission coupled to the second electric machine;
   a disconnect arranged between a shaft coupled to the first transmission and a shaft coupled to the second transmission, wherein the disconnect is configured to mechanically couple the first transmission and the second transmission; and
   a controller including instructions stored on non-transitory memory that when executed cause the controller to:
      operate the first electric machine in a motor state and the second electric machine in a generator state, wherein the first electric machine is mechanically coupled to the second electric machine via the disconnect being engaged.

2. The electric drive unit of claim 1, wherein the disconnect is arranged within the housing.

3. The electric drive unit of claim 1, wherein the disconnect is arranged outside the housing.

4. The electric drive unit of claim 1, wherein the shaft of the first electric machine and the second electric machine are arranged within the housing.

5. The electric drive unit of claim 1, wherein the wherein the shaft of the first electric machine and the shaft of the second electric machine are outside the housing.

6. The electric drive unit of claim 1, wherein the first electric machine and the second electric machine share a common axis of rotation.

7. The electric drive unit of claim 1, wherein the instructions further cause the controller to:
   select a mode of the electric drive unit from a plurality of modes including the first mode; and
   adjust the disconnect between an engaged state and a disengaged state and the first electric machine and the second electric machine between a generator state and a motor state based on the selected mode.

8. A method for operating an electric drive unit of a vehicle, comprising:
   selecting a first mode of the electric drive unit in response to determining a torque within a threshold range, the electric drive unit include a first electric machine and a second electric machine positioned within a housing, wherein the first electric machine is mechanically coupled to the second electric machine via a clutch; and
   in response to selecting the first mode, adjusting the clutch to an engaged state, the first electric machine to a motor state and the second electric machine to a generator state.

9. The method of claim 8, further comprising selecting a second mode of the electric drive unit in response to determining a positive torque outside the threshold range and the vehicle is not cornering, and in response to selecting the second mode, adjusting the first electric machine and the second electric machine to the motor state and the clutch to the engaged state.

10. The method of claim 8, further comprising selecting a third mode of the electric drive unit in response to determining a positive torque outside the threshold range and the vehicle is cornering, and in response to selecting the third mode, adjusting the first electric machine and the second electric machine to the motor state and the clutch to a disengaged state.

11. The method of claim 8, further comprising selecting a fourth mode of the electric drive unit in response to determining a negative torque outside the threshold range and the vehicle is not cornering, and in response to selecting the fourth mode adjusting the first electric machine and the second electric machine to the generator state and the clutch to the engaged state.

12. The method of claim 8, further comprising selecting a fifth mode of the electric drive unit in response to determining a negative torque outside the threshold range and the vehicle is cornering, and in response to selecting the fifth mode adjusting the first electric machine and the second electric machine to the generator state and the clutch to a disengaged state.

13. A vehicle, comprising:
a first wheel and a second wheel;
an electric drive unit including a first transmission coupled to the first wheel and second transmission coupled to the second wheel, a first electric machine coupled to the first transmission and a second electric machine coupled to the second transmission, wherein the first electric machine is coupled the second electric machine via shafts and a disconnect; and
a controller including instructions stored on non-transitory memory that when executed cause the controller to:
determine a torque of the vehicle;
select a mode of the electric drive unit, the mode including a state of the first electric machine, a state of the second electric machine, and a state of the disconnect in response to the determined torque; and
adjust states of the first electric machine, second electric machine, and disconnect according to the selected mode, wherein the first electric machine and the second electric machine are in different states in response to the determined torque within a threshold range.

14. The vehicle of claim 13, wherein the controller adjusts the state of the first electric machine and the second electric machine between a motor state and a generator state in response to a sign of the determined torque and the determined torque compared to a threshold range.

15. The vehicle of claim 13, wherein the instructions further cause the controller to determine if the vehicle is cornering and the controller adjusts the state of the disconnect between engaged and disengaged in response to a magnitude of the determined torque compared to a threshold range and based on the vehicle cornering or not cornering.

16. The vehicle of claim 13, wherein the electric drive unit further includes a housing and the first electric machine and the second electric machine are arranged within the housing.

17. The vehicle of claim 13, wherein the first electric machine is coupled to the second transmission when the disconnect is in an engaged state.

18. The vehicle of claim 13, wherein instructions to select the mode of the electric drive unit further comprise to determine if the torque is positive or negative and to determine if the vehicle is cornering.

* * * * *